(12) United States Patent
Kerrigan et al.

(10) Patent No.: US 7,180,753 B2
(45) Date of Patent: Feb. 20, 2007

(54) SERVER PACKAGING ARCHITECTURE UTILIZING A BLIND DOCKING PROCESSOR-TO-MIDPLANE MECHANISM

(75) Inventors: Brian M. Kerrigan, Cary, NC (US);
Karl K. Dittus, Durham, NC (US);
Matthew S. Henry, Raleigh, NC (US);
Michael S. Miller, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 10/606,454

(22) Filed: Jun. 26, 2003

(65) Prior Publication Data

US 2004/0264123 A1 Dec. 30, 2004

(51) Int. Cl.
*H05K 7/14* (2006.01)
*H05K 7/18* (2006.01)

(52) U.S. Cl. ............... 361/797; 361/756; 361/686; 361/724; 439/377

(58) Field of Classification Search ........... 361/760, 361/730, 748–749, 719–720, 796, 800, 752, 361/797, 724, 714, 727, 756, 686, 801–802, 361/741; 439/377
See application file for complete search history.

(56) References Cited

U.S. PATENT DOCUMENTS

| | | | | |
|---|---|---|---|---|
| 4,445,740 A | * | 5/1984 | Wallace ............... | 439/152 |
| 5,317,481 A | * | 5/1994 | Hillis et al. ........... | 361/796 |
| 5,325,269 A | * | 6/1994 | Someno ............... | 361/796 |
| 5,652,697 A | * | 7/1997 | Le ..................... | 361/788 |
| 5,868,585 A | * | 2/1999 | Barthel et al. ........ | 439/377 |
| 5,991,163 A | | 11/1999 | Marconi et al. ....... | 361/788 |
| 6,053,760 A | * | 4/2000 | Bailis et al. .......... | 439/377 |
| 6,115,258 A | * | 9/2000 | Hoyle et al. .......... | 361/752 |

(Continued)

*Primary Examiner*—Kamand Cuneo
*Assistant Examiner*—Hung S. Bui
(74) *Attorney, Agent, or Firm*—Sawyer Law Group LLP

(57) ABSTRACT

A dual motion docking apparatus for docking an electronics console to a component board in a chassis is disclosed. The electronics console and the component board lie in the same plane of the chassis, but the electronics console must be mated with the component board at an angle orthogonal to a direction of installation of the electronics console. Aspects of the present invention include a first docking mechanism for slidably inserting the electronics console into a chassis, such that connectors on the electronics console align with connectors on the component board. The first docking mechanism preferably comprises a docking base coupled to the electronics console that has a longitudinal female portion, and a longitudinal male portion located on an underside of the electronics console, wherein when the electronics console is inserted into an opening in a chassis, the male portion engages the female portion of the docking base to guide the electronics console along the docking base as the electronics console is slid into the chassis. The dual motion docking apparatus further includes a second docking mechanism for laterally moving the electronics console towards the component board, such that the electronics console connectors engage the component board connectors, thereby enabling the blind docking between the electronics console and the component board. The second docking mechanism preferably comprises a handle extending from a front of the electronics console, and a cam mechanism having a portion that is held immobile by a docking base, wherein after the electronics console is slid into the chassis, the handle is pushed rearward by hand to actuate the cam mechanism, which then pulls the electronics console towards the component board.

19 Claims, 10 Drawing Sheets

U.S. PATENT DOCUMENTS

| | | | |
|---|---|---|---|
| 6,137,684 A | 10/2000 | Ayd et al. | 361/727 |
| 6,222,708 B1 | 4/2001 | Severson et al. | 361/2 |
| 6,229,708 B1 | 5/2001 | Corbin, Jr. et al. | 361/728 |
| 6,272,573 B1 | 8/2001 | Coale et al. | 710/100 |
| 6,373,712 B1 * | 4/2002 | Bailis et al. | 361/756 |
| 6,821,141 B1 * | 11/2004 | Liu | 439/377 |
| 6,845,015 B2 * | 1/2005 | Byrne et al. | 361/741 |

* cited by examiner

FIG. 6
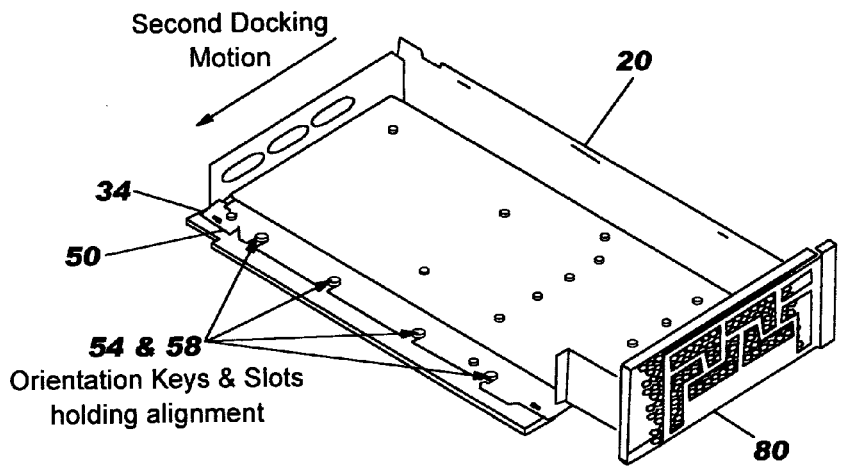
FIG. 7A                    FIG. 7B
Midplan and CEC shown oriented & engaged via docking plate
Rear view                    Top View
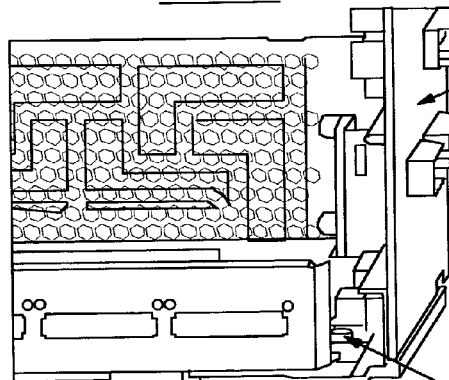
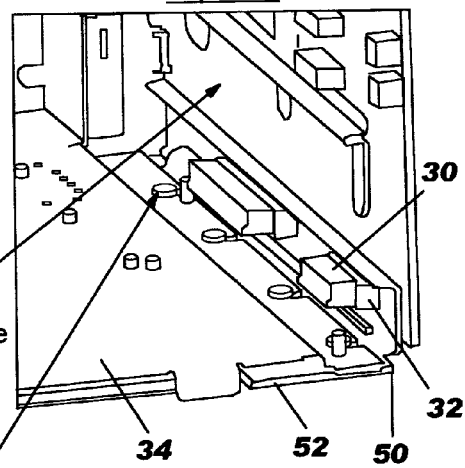

Top View of Undocked CEC

Bottom View of Docking Mechanism - shown undocked

CEC Docking Plate Showing CEC Docked

SERVER PACKAGING ARCHITECTURE UTILIZING A BLIND DOCKING PROCESSOR-TO-MIDPLANE MECHANISM

FIELD OF THE INVENTION

The present invention relates to server packaging architectures, and more particularly to a dual motion mechanism for blind docking (printed circuit boards). Specifically for blind docking a processor board assembly to an orthogonally-oriented vertical midplane component board within a server chassis.

BACKGROUND OF THE INVENTION

Servers are designed today with a chassis that includes many electrical components and discrete functionality cards. For example, a server may comprise discrete functionality boards including, but not limited to those such as, an I/O card, a PCI subsection, a main central processor board, media devices, hard disk storage devices, and a service processor card. The components and cards are electrically connected to a component board, such as a midplane component board, through high-speed connectors, such as, but not limited to, connector styles such as (HDM or VHDM). The function of the component board is to distribute power and to connect the various components and cards together.

Conventionally, the component board is mounted vertically inside the chassis, while the central processor board and the PCI subsection lie flat or horizontal and connect to the component board at right angles. There are generally two methods for implementing a vertical component board architecture. The first utilizes a component board mounted laterally in the chassis (i.e., side-to-side). In this architecture, the central processor board is installed in a single motion by sliding the board into the chassis towards the component board until their connectors engage.

The second method for implementing a vertical component board architecture utilizes a component board mounted in the chassis in a front-to-rear orientation. In this architecture, several central processor boards may be installed in the chassis on one side of the component board, in which case the boards occupy all of the vertical space in the chassis on that side of the component board.

In some applications, however, only one central processor board is required, leaving space available in the chassis above the board. In this configuration, the thermal subsystem and even the power subsystem may be located in the chassis directly above the central processor board. In this case, the central processor board cannot be installed from the top of the chassis, and must instead be installed from the front.

However, because the component board is mounted in the chassis parallel to the direction of installation of the processor board, a bi-directional docking mechanism is required to insert the central processor board into the chassis from front-to-rear, and to then laterally dock the board to the component board. The present invention addresses such a need.

SUMMARY OF THE INVENTION

A dual motion docking apparatus for docking an electronics console to a component board in a chassis is disclosed. The electronics console and the component board lie in the same plane of the chassis, but the electronics console must be mated with the component board at an angle orthogonal to a direction of installation of the electronics console. Aspects of the present invention include a first docking mechanism for slidably inserting the electronics console into a chassis, such that connectors on the electronics console align with connectors on the component board. The first docking mechanism preferably comprises a docking base coupled to the electronics console that has a longitudinal female portion, and a longitudinal male portion located on an underside of the electronics console, wherein when the electronics console is inserted into an opening in a chassis, the male portion engages the female portion of the docking base to guide the electronics console along the docking base as the electronics console is slid into the chassis. The dual motion docking apparatus further includes a second docking mechanism for laterally moving the electronics console towards the component board, such that the electronics console connectors engage the component board connectors, thereby enabling the blind docking between the electronics console and the component board. The second docking mechanism preferably comprises a handle extending from a front of the electronics console, and a cam mechanism having a portion that is held immobile by a docking base, wherein after the electronics console is slid into the chassis, the handle is pushed rearward by hand to actuate the cam mechanism, which then pulls the electronics console towards the component board.

According to the apparatus and method of the present invention, an operator can easily install or remove the electronics console from the front/rear of the chassis without having to remove other components even though the electronics console is mated with the component board at a ninety-degree angle.

BRIEF DESCRIPTION OF THE DRAWINGS

FIG. 6 is a diagram illustrating the base plate and the docking base when the CEC is in the docked position.

FIGS. 7A and 7B are views in which the docking base can be seen attached to the bottom of the component board.

DETAILED DESCRIPTION OF THE INVENTION

The present invention relates to mechanical docking mechanisms for electronic boards. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
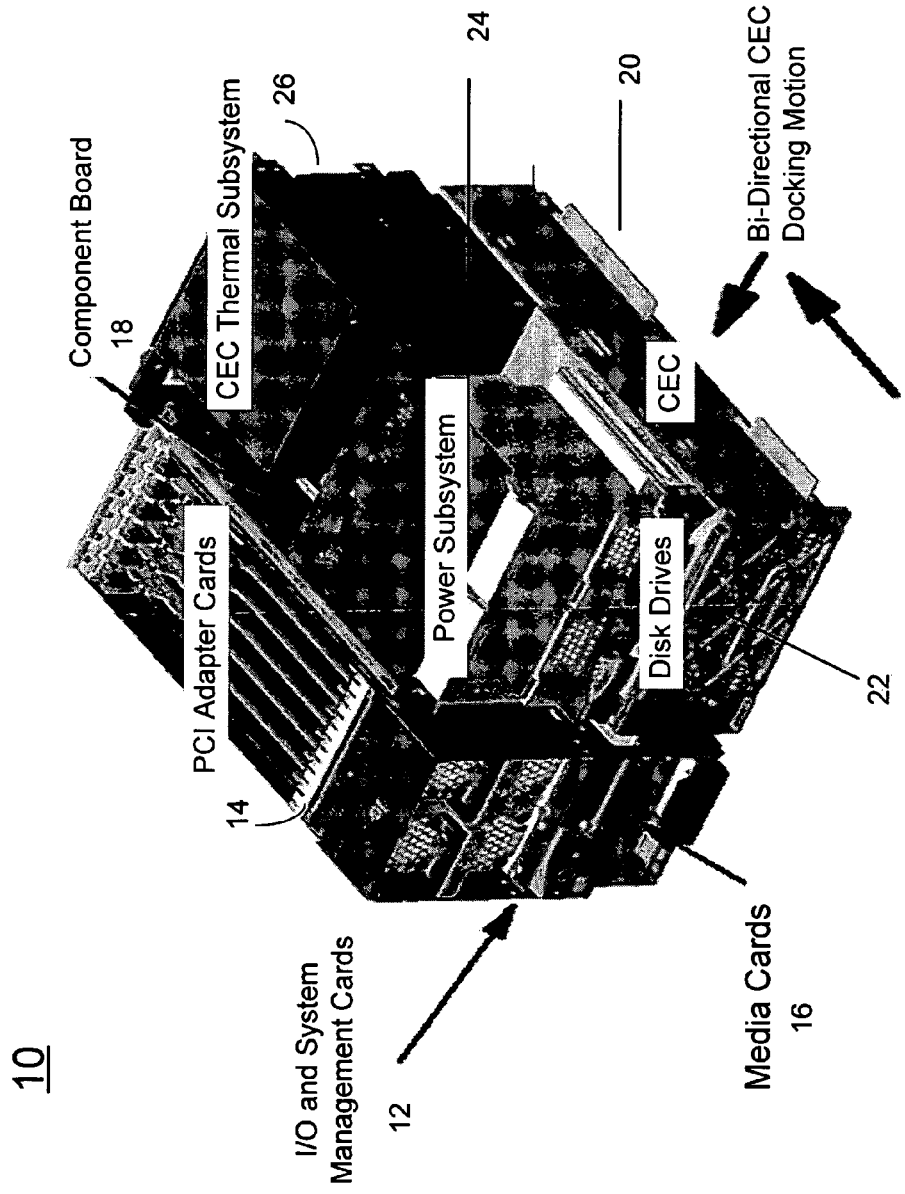
FIG. 1 is a diagram illustrating a server system architecture incorporating a bi-directional docking mechanism in accordance with a preferred embodiment of the present invention.
Figure 2:
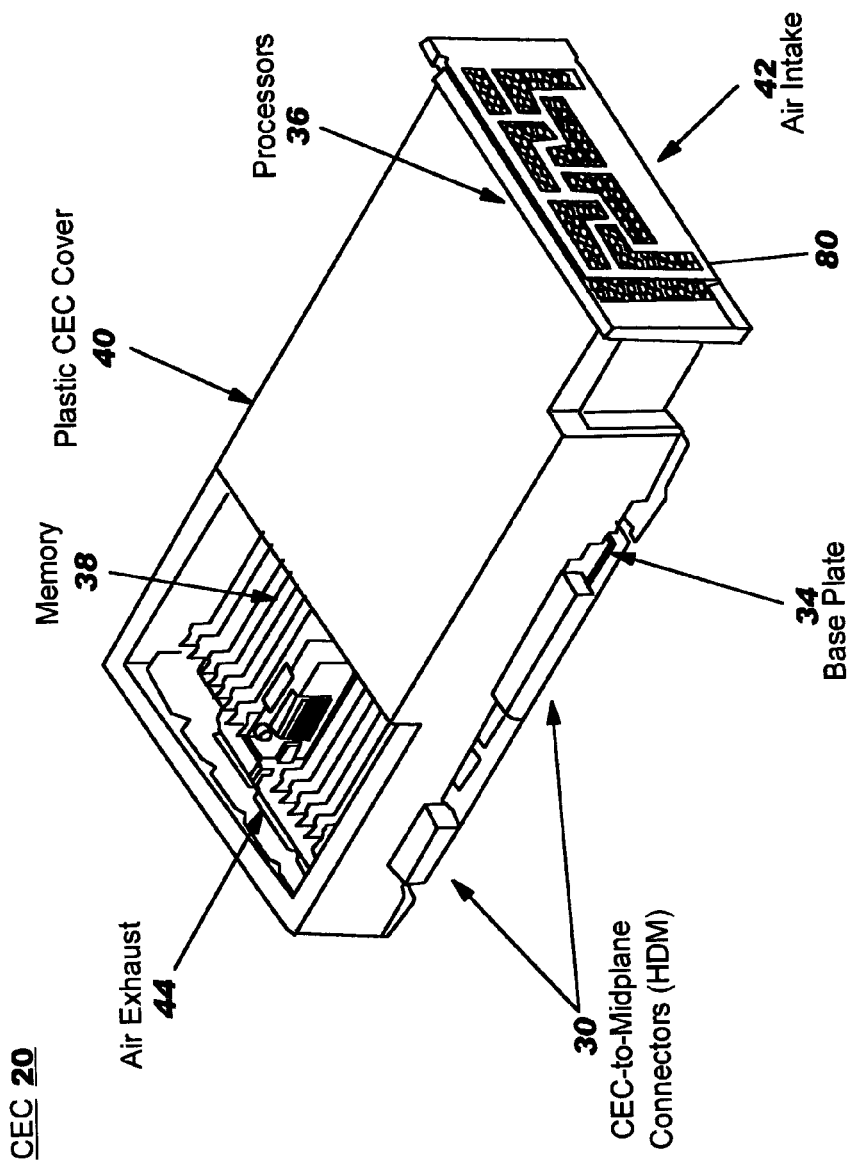
FIG. 2 is a diagram illustrating a Central Electronics Console (CEC).

FIG. 1 is a diagram illustrating a server system architecture incorporating a bi-directional docking mechanism in accordance with a preferred embodiment of the present invention. All the components of the system 10 are enclosed by a main chassis, which is not shown for purposes of illustration. The components of the system 10 include I/O and system management cards 12, PCI adapter cards to 14, media cards 16, a component board, such as midplane component board 18, a main central processor board 20, hard disk storage devices 22, a power subsystem 24, and a thermal subsystem 26.

The component board 18 is mounted vertically in the chassis in a front-to-rear orientation. A single main central processor board, hereinafter referred to as a central electronics console (CEC) 20, is located on one side of the component board 18. With respect to the chassis, the CEC 20 lies on the same horizontal plane as the component board 18, and lies parallel to the component board 18 along a direction of insertion (front-to-back). In the preferred embodiment, the direction of insertion is along a longitudinal axis of the CEC 20 and the chamber in the chassis in which it is inserted and housed.

In order to keep the depth of the chassis and short as possible, space in the chassis above the CEC 20 is efficiently utilized by the power subsystem 24 and the CEC thermal subsystem 26. Fans within thermal subsystem 26 draw air through the CEC 20 for cooling.

Figure 3A:
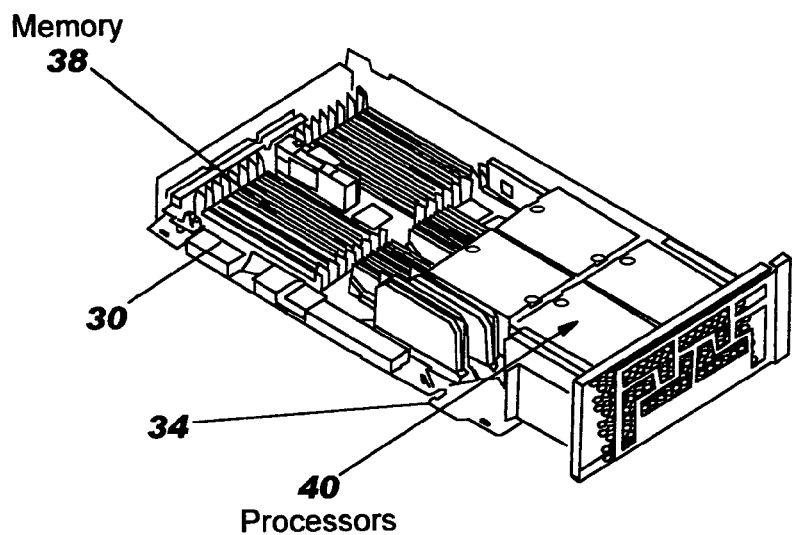
FIGS. 3A–3C are diagrams showing the CEC without a cover.
Figure 3B:
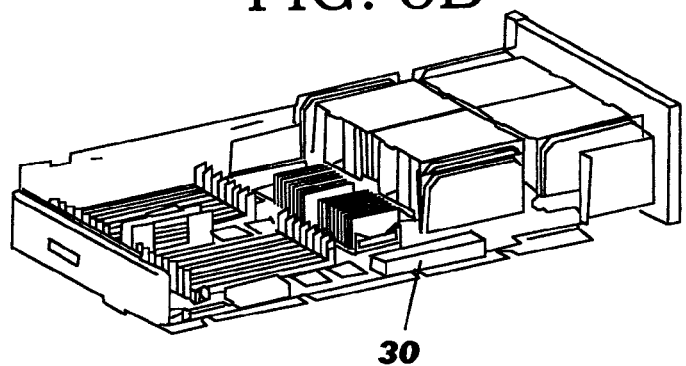
Figure 3C:
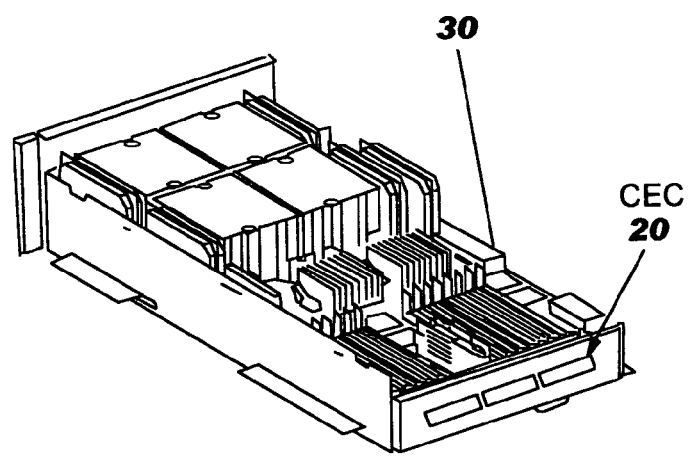

FIGS. 2 and 3A–3C are diagrams illustrating the CEC in further detail. The CEC 20 is supported by a base plate 34 on which high-density connectors 30, processor 36, and memory 38 are mounted. An airtight cover 40 covers the processors 36, but not the memory 38. The fan in the thermal subsystem 26 creates a negative pressure drop, creating an airflow from the air intake 42 in the front of the CEC 20 to the air exhaust 44 over the memory 38. FIGS. 3A–3C show the CEC 20 with the cover 40 removed.

Figure 4:
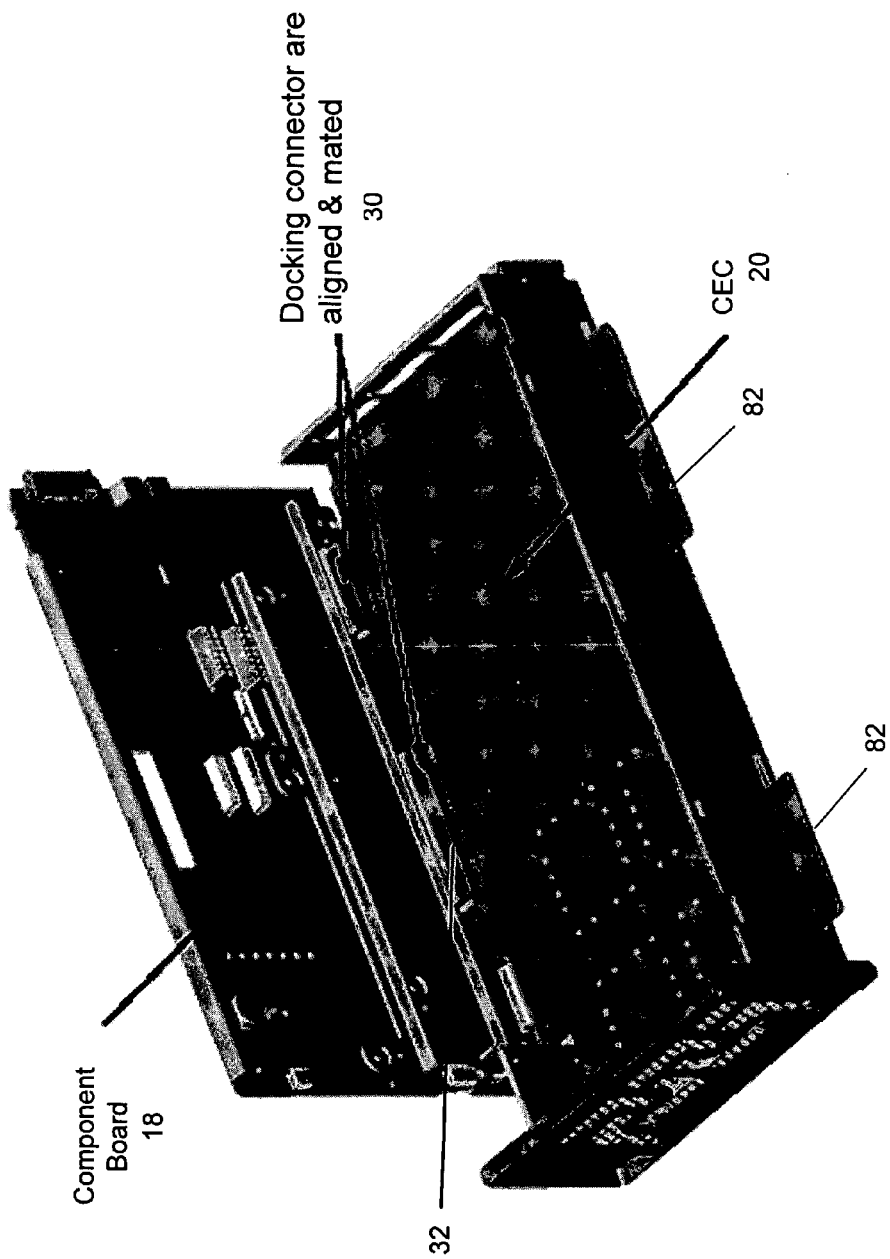
FIG. 4 is a diagram showing a cut-away view of the CEC docked with the component board.

In a preferred embodiment, the CEC 20 is installed through an opening in the front of the chassis under the power subsystem 24. FIG. 4 is a diagram showing a cut-away view of the CEC 20 docked with the component board 18. Once the CEC 20 is installed in the chassis, docking connectors 30, which are located on the side of the CEC 20 adjacent to the component board 18, engage with connectors 32 on the component board 18. Although the CEC 20 lies in the same horizontal plane in the chassis as the component board 18, the CEC 20 must be mated with the component board at an angle orthogonal to the direction of installation of the CEC 20.

The present invention provides a bi-directional docking mechanism that enables the CEC 20 to be installed from the front/rear of the chassis, and subsequently moved laterally to dock with the component board 18. The docking mechanism provides both required dual motions, and precisely orients the CEC docking connectors 30 with the connectors 32 on the component board 18 to allow blind docking between the CEC 20 and the component board 18.

According to the present invention, the first docking motion occurs during installation in which an operator inserts the CEC 20 into an opening in the front of the chassis and slides the CEC 20 from front-to-rear. When the back of CEC 20 reaches the rear the chassis, the CEC 20 is positioned such that the CEC connectors 32 align with, and are in close proximity to, the component board connectors 32.

After the installation motion, a second docking motion laterally moves the CEC along the horizontal plane of the chassis towards the component board 18, such that the CEC connectors 30 engage the component board connectors 32, thereby enabling blind docking between the CEC 20 and the component board 18.

Figure 5A:
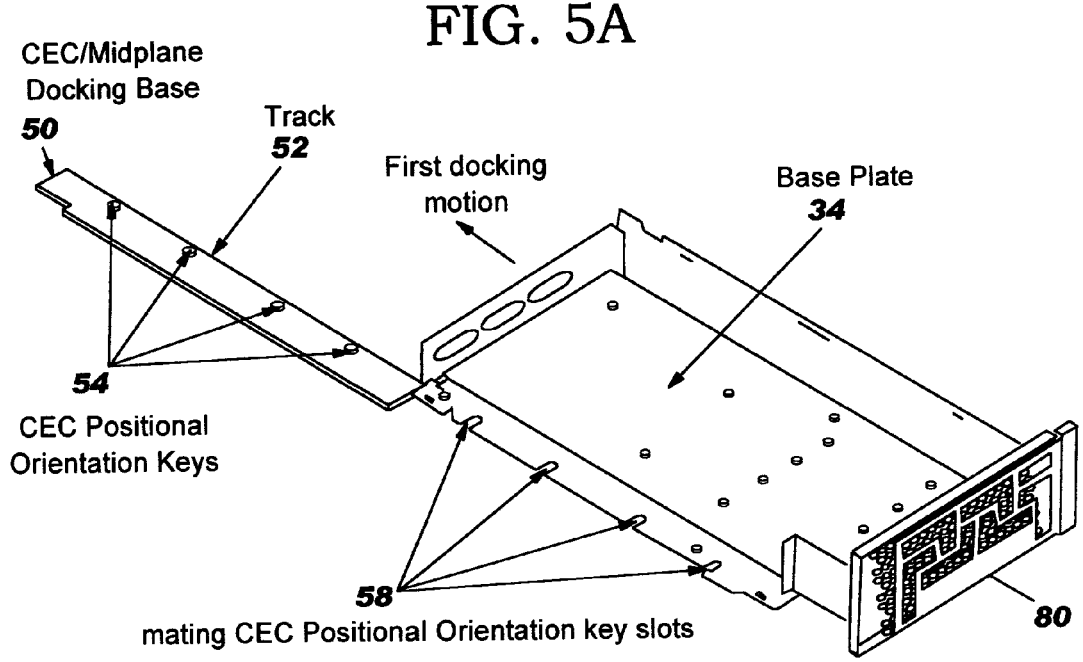
FIGS. 5A and 5B are diagrams illustrating components of the dual motion docking mechanism that enable the first docking motion.

FIGS. 5A and SB are diagrams illustrating components of the dual motion docking mechanism that enable the first docking motion. In FIG. 5A, the CEC 20 is shown with the electronics and cover removed showing the top of the base plate 34. In one preferred embodiment of the present invention, the first docking motion is partially implemented by attaching a component board docking base 50 to the bottom of the component board 18 (not shown) and to the rear of the chassis.

FIGS. 7A and 7B are views in which the docking base 50 can be seen attached to the bottom of the component board 18. The component board 18 can be inserted and removed from the chassis from the rear. In a preferred embodiment, the component board 18 has an interlocking spring pin (not shown) that locks the component board 18 into position on the docking base 50 as the component board is pushed into the chassis from the back and reaches its front-most position.

Referring again to FIG. 5A, the docking base 50 is preferably rectangular with a length generally matching that of the component board 18. The docking base 50 includes a longitudinal female track 52 extending along an outer edge, away from the component board 18, and multiple positional orientation keys 54 longitudinally aligned along the edge closest to the component board 18.

Figure 5B:
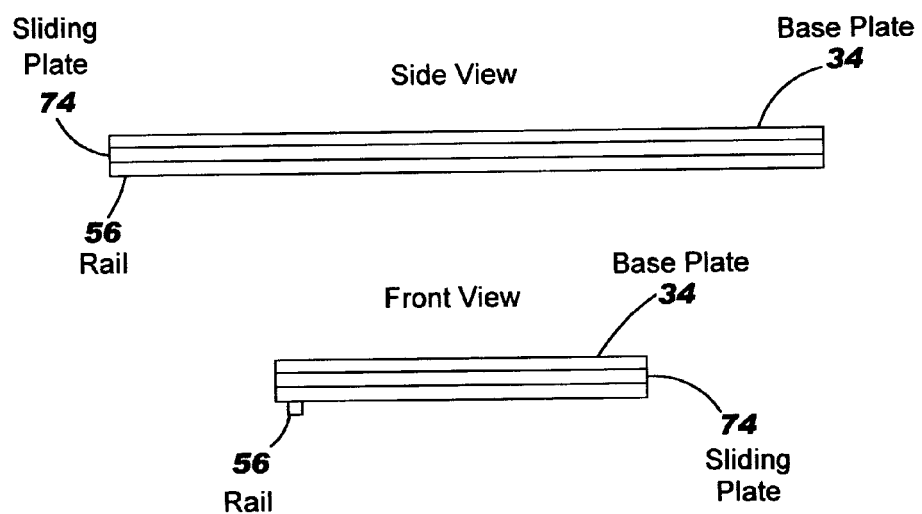

FIG. 5B is a diagram showing a side and front view of the base plate 34. Beneath the base plate 34 is attached a sliding plate 74 (see also FIGS. 9–11). The sliding plate 74 includes a longitudinal male rail 56 on the bottom thereof located along a side of the CEC 20 adjacent to the component board 18. The rail 56 fits within track 52 on the docking base 50. As shown in both FIGS. 5A and 5B, the base plate 34 further includes multiple positional orientation keys slots that mate with the orientation keys 54 of the docking base 50.

When the CEC 20 is presented into the chassis opening during installation, the rail 56 engages the track 52 on the docking base 50, allowing the CEC 20 to be slid into the chassis over the docking base 50. As the CEC 20 is slid to the rear of the chassis, the CEC 20 is guided by the docking base track 52. When the CEC 20 reaches its resting position, all of the keys 54 align with the respective keys slots 58.

FIG. 6 is a diagram illustrating the base plate 34 and the docking base 50 when the CEC 20 is in the docked position. During the second docking motion, the CEC 20 is moved laterally towards the component board 18, the implementation of which is described below. According to the present invention, the orientation keys slots 58 on the base plate 34 mate with the orientation keys 54 of the base plate 50 to ensure that CEC connectors 30 correctly align with the component board connectors 32 when the CEC 20 is in the final docked position. The orientation keys 54 and keys slots 58 are staggered in distance and aligned with one another in a manner that prevents the docking of the CEC 20 with the component board 18 in all, but the final correct position.

FIGS. 8–11 are diagrams illustrating components of the dual motion docking mechanism that enable the second docking motion. In a preferred embodiment, the components necessary for the second docking motion include an actuator handle 70 and a cam mechanism 72. According to the present invention, the CEC 20 is installed into the chassis with the actuator handle 70 extended from the front of the CEC 20. Once the CEC 20 slid fully to the rear, the actuator handle 70 is pushed rearward by hand, which actuates the cam mechanism 72. The cam mechanism 72, a portion of which is held immobile by the base plate 50, then pulls the CEC 20 towards the docking base until the CEC connectors 30 mate with the component board connectors 32.

Figure 9:
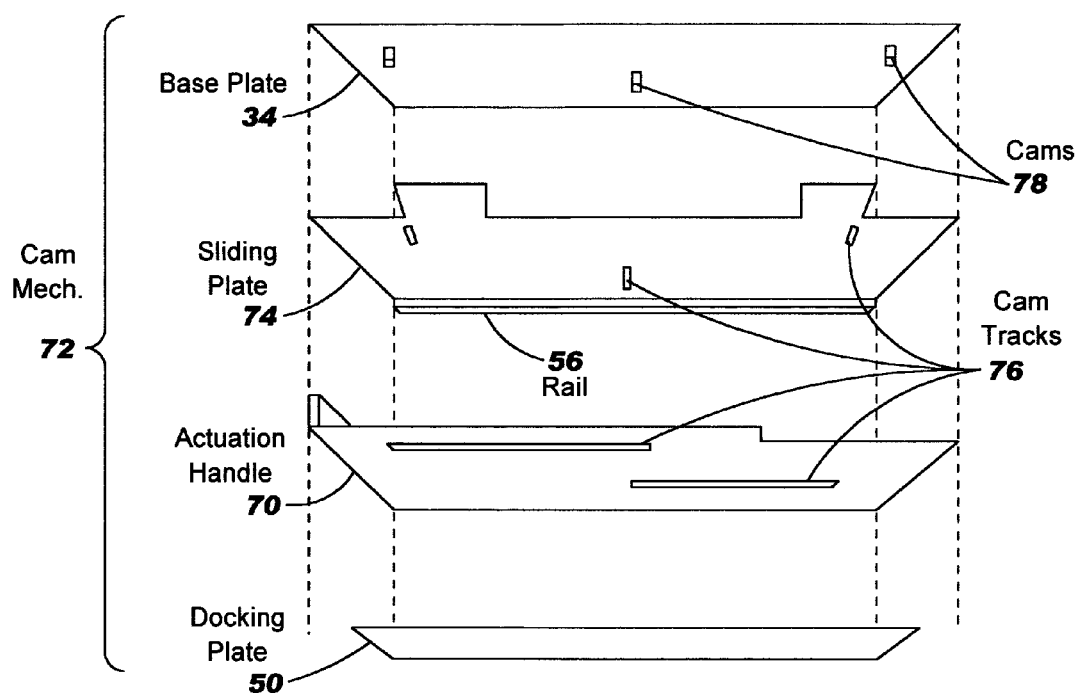

FIG. 9 is an exploded view of a preferred embodiment of the cam mechanism 72. In the cam mechanism 72, the sliding plate 74 is mounted under the base plate 34. The activation handle 70 is slidably mounted beneath the sliding plate 74 for front-to-back motion (and vice versa). Both the sliding plate 74 and the actuation handle 70 include multiple cam tracks 76 (preferably three). The cam tracks 76 on the sliding plate 74 are positioned perpendicular to the longitudinal axis of the CEC 20, while the cam tracks 76 on the actuation handle 70 are positioned parallel to the longitudinal axis of the CEC 20. Multiple cams 78 (preferably three) are mounted to the base plate 34. The respective cam tracks 76 of the sliding plate 74 and the actuation handle 70 are vertically aligned such that one cam 78 extends through one pair of aligned cam tracks 76.

Figure 11:
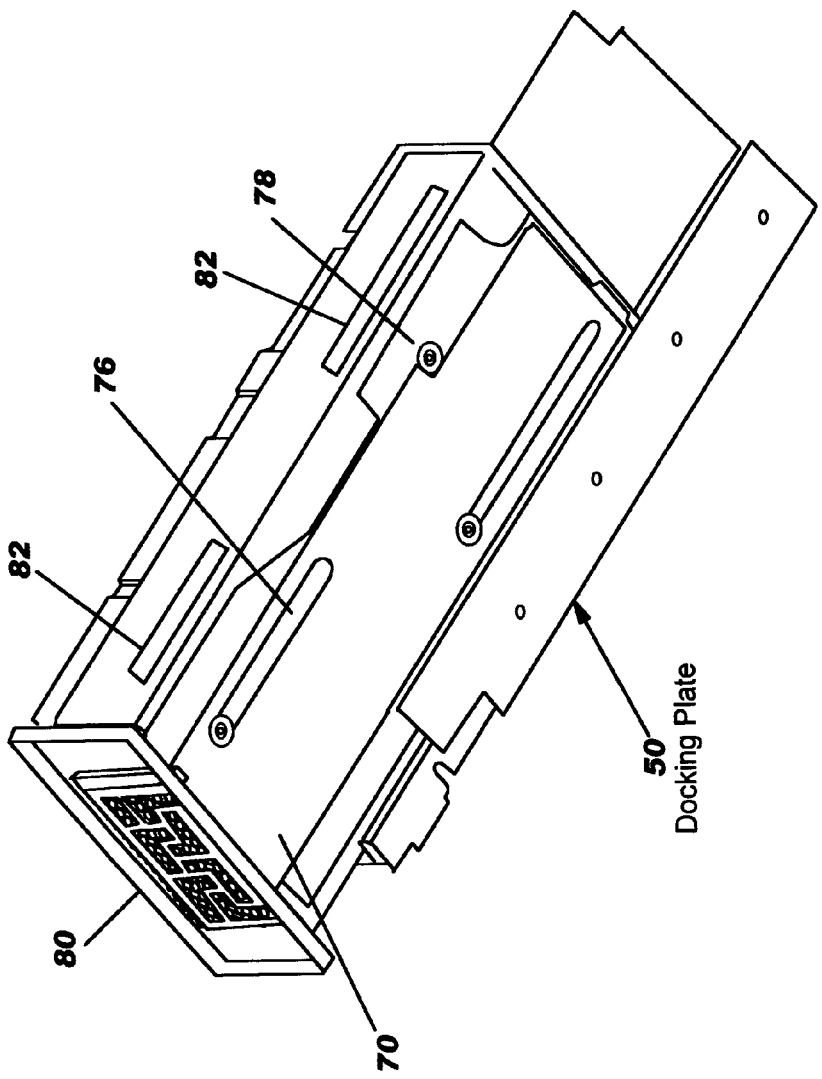

As shown in FIGS. 5B and 11, the sliding plate 74 allows the CEC 20 to be slid into the stationery docking base 50. Once mated to the docking base 50, the sliding plate 74 is fixed in place. However, the base plate 34 of the CEC 20 is free to move horizontally with respect to sliding plate 74 due to the cam mechanism 72. When the actuation handle 70 is pushed in, the cams 78 slide in the cam tracks 76 and pull the CEC 20 toward over the fixed sliding plate 74 and towards the component board 18 to engage the connectors 30 and 32.

Figure 10:
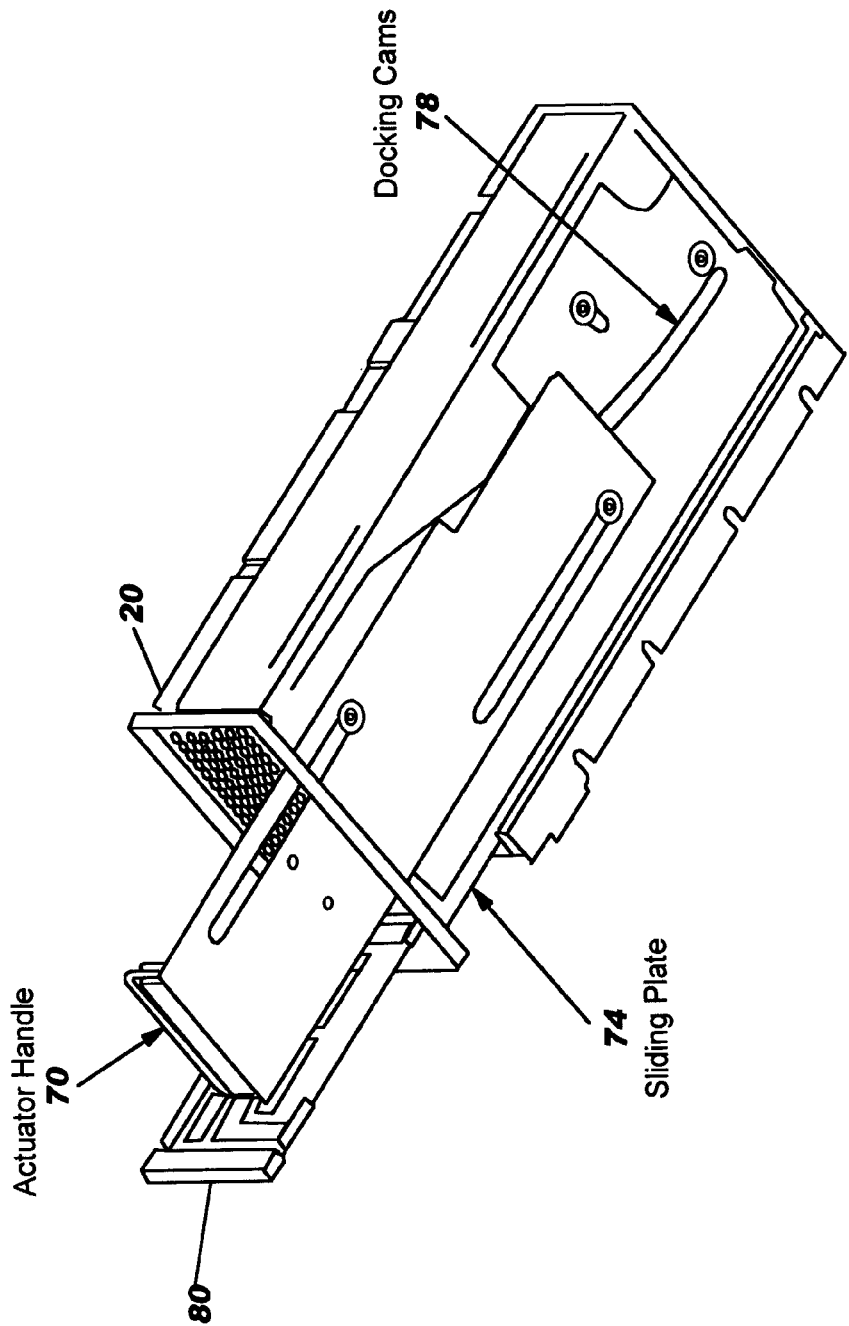

FIG. 10 shows a bottom view of the CEC 20 in an undocked position with the actuation handle 70 extended. FIG. 11 shows a bottom view of the CEC 20 in the docked position with the actuation handle 70 pushed-in and an access cover 80 of the CEC 20 closed.

To undock the CEC 20, the front access cover 80 is opened and the actuator handle 70 is pulled out from the front of the CEC 20. This results in the CEC 20 moving laterally away from the component board 18 to disengage the connectors 30 and 32. The orientation keys slots 58 are also pulled away from the orientation keys 54 (FIGS. 5A and 6). An operator is then free to pull the CEC 20 out of the chassis along the rail 56 and track 52 of the sliding plate 74 and docking base 50, respectively.

As processor cards, such as the CEC 20, become larger and include more components, the mass of the CEC 20 may cause the CEC 20 to shake during operation of the server. Overtime, the shaking may cause pins within the connectors 30 and 32 to break.

Figure 8:
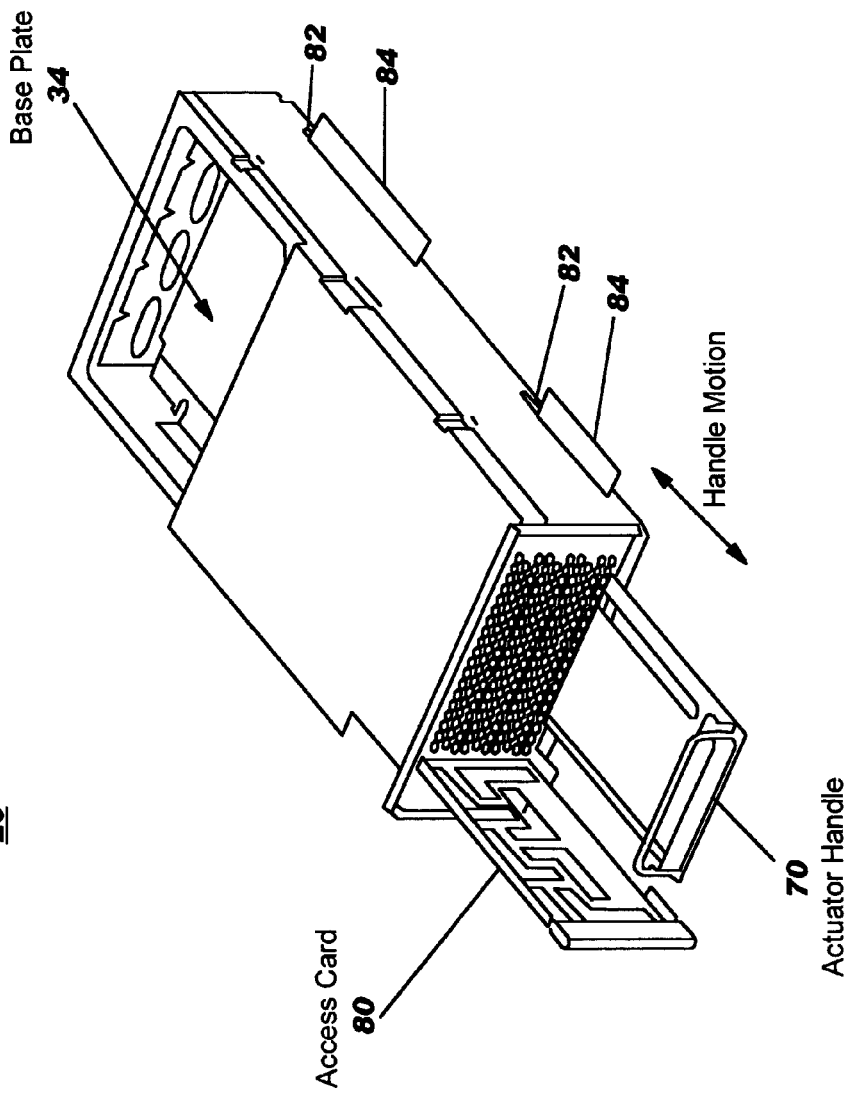
FIGS. 8–11 are diagrams illustrating components of the dual motion docking mechanism that enable the second docking motion.

According to a further aspect of the present invention, the dual motion docking mechanism also reduces vibrations experienced by the CEO 20. As shown in FIGS. 4, 8, 9, and 11, the sliding plate 74 is provided with two retractable lateral support members 82. The side of the CEO 20 opposite that of the component board 18 includes two horizontal openings 84 for the retractable lateral support members 82. FIGS. 8 and 10 shows the CEO 20 in the undocked position in which the lateral support members 82 are retracted and flush with the side of the CEC 20. Referring to FIGS. 4 and 11, as the actuation handle 70 is pushed in, and the CEC 20 moves towards the component board 18, the lateral support members 82 are exposed through the slits 84. The extended lateral support members 82 restrain the CEC both vertical and horizontally.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A dual motion docking apparatus for docking an electronics console to a component board in a chassis, the dual motion docking apparatus comprising:
   a first docking mechanism for slidably inserting the electronics console into the chassis in a first direction, such that connectors on the electronics console align with connectors on the component board, wherein the first docking mechanism comprises;
   a docking base having a longitudinal female portion, and
   a longitudinal male portion located on an underside of the electronic console, wherein when the electronic console is inserted into an opening in the chassis, the male portion engaged the female portion of the docking base to guide the electronic console along the docking base as the electronic console is slid into the chassis; and
   a second docking mechanism for laterally moving the electronics console towards the component board, in a second direction, such that the electronics console connectors engage the component board connectors, thereby enabling the blind docking between the electronics console and the component board, wherein the second direction is orthogonal to the first direction.

2. The apparatus of claim 1, wherein the electronics console includes a base plate that includes at least one key slot, and the docking base includes at least one key, wherein after the electronics console is slid into the chassis, respective keys are aligned with respective key slots.

3. The apparatus of claim 2, wherein after operation of the second docking mechanism, the keys slots on the base plate mate with the keys of the docking base to ensure that the electronics console connectors correctly align with the component board connectors when the electronics console is in a final docked position.

4. The apparatus of claim 1, wherein the electronics console further includes retractable lateral support members in a side opposite the component board, wherein when the electronics console is in an undocked position, the lateral support members are retracted within the side of the electronics console, and when the electronics console is in a final docked position, the lateral support members extend from the side to restrain the electronics console both vertical and horizontally.

5. The apparatus of claim 1, wherein the component board is vertically mounted in the chassis in a front-to-rear orientation, and wherein the electronics console is installed into the chassis along an axis parallel to the component board.

6. The apparatus of claim 1, wherein the electronics console comprises a central electronics console.

7. The apparatus of claim 1, wherein the second docking mechanism comprises;
   a handle extending from a front of the electronic console, and
   a cam mechanism, the cam mechanism having a portion that is held immobile by a docking base, wherein after the electronic console is slid into the chassis, the handle is pushed rearward by by hand to actuate the cam mechanism, which when pulls the electronic console toward the component board.

8. The apparatus of claim 7, wherein the cam mechanism comprises:
   a base plate supporting the electronics console,
   a sliding plate mounted under the base plate, wherein the handle is slidably mounted beneath the sliding plate;
   multiple cam tracks on the sliding plate positioned perpendicular to the longitudinal axis of the electronics console;
   multiple cam tracks on the handle positioned parallel to the longitudinal axis of the electronics console; and
   multiple cams mounted to the base plate, wherein the respective cam tracks of the sliding plate and the handle are vertically aligned, such that one cam extends through one pair of aligned cam tracks.

9. The apparatus of claim 8, wherein the sliding plate includes a longitudinal male member that engages with a longitudinal female member on a docking base, which fixes the sliding plate in place so that the base plate of the electronics console is free to move horizontally with respect to sliding plate.

10. A method for docking an electronics console to a component board in a chassis, the method comprising;
   providing a first docking mechanism for slidably inserting the electronic console into the chassis in a first direction, such that connection on the electronic console align with connectors on the component board, wherein the first docking mechanism comprises;
      providing a docking base having a longitudinal female portion, and
      providing a longitudinal male portion located on an underside of the electronic console, wherein when the electronic console is inserted into an opening in the chassis, the male portion engaged the female portion of the docking base to guide the electronic console along the docking base as the electronic console is slid into the chassis; and
   providing a second docking mechanism for laterally moving the electronics console towards the component board in a second direction, such that the electronics console connectors engage the component board connectors, thereby enabling the blind docking between the electronics console and the component board, wherein the second direction is orthogonal to the first direction.

11. The method of claim 10, further comprising;
   providing the electronic console with a base plate that includes at least one key slot, wherein the docking base includes at least one key such that after the electronic console is slid into the chassis, respective keys are aligned with respective key slots.

12. The method of claim 11, wherein step after operation of the second docking mechanism, the key slots on the base plate mate with the keys of the docking base to ensure that the electronic console connectors correctly align with the components board connectors when the electronic console is in a final docked position.

13. The method of claim 10, further comprising:
   providing the electronics console with retractable lateral support members in a side opposite component board, wherein when the electronics console is in an undocked position, the lateral support members are retracted within the side of the electronics console and when the electronics console is in a final docked position, the lateral support members extend from the side and restrain the electronics console both vertical and horizontally.

14. The method of claim 10, further comprising:
   vertically mounting the component board in the chassis in a front-to-rear orientation; and
   installing the electronics console in the chassis along an axis parallel to the component board.

15. The method of claim 10, wherein the electronic console comprises a central electronic console.

16. The method of claim 10, wherein providing a second docking mechanism comprises;
   providing a handle extending from a front of the electronics console, and
   providing a cam mechanism, the cam mechanism having a portion that is held immobile by a docking base, wherein after the electronics console is slid into the chassis, the handle is pushed rearward by hand to actuate the cam mechanism, which then pulls the electronics console towards the component board.

17. The method of claim 16, further comprising:
   providing the cam mechanism with,
      a base plate supporting the electronics console,
      a sliding plate mounted under the base plate, wherein the handle is slidably mounted beneath the sliding plate,
      multiple cam tracks on the sliding plate positioned perpendicular to the longitudinal axis of the electronics console,
      multiple cam tracks on the handle positioned parallel to the longitudinal axis of the electronics console, and
      multiple cams mounted to the base plate, wherein the respective cam tracks of the sliding plate and the handle are vertically aligned, such that one cam extends through one pair of aligned cam tracks.

18. The method of claim 17, further comprising;
   providing the sliding plate with a longitudinal male member that engages with a longitudinal female member on a docking base, which fixes the sliding plate in place so that the base plate of the electronics console is free to move horizontally with respect to sliding plate.

19. The method of for docking an electronic console to a midplane in a chassis, the method comprising;
   attaching a docking base to the chassis and the midplane, the docking base having a longitudinal female portion,
   providing the electronic console with,
      a base plate,
      a sliding plate mounted beneath the base plate, the sliding plate having a longitudinal male portion,
      an extendable handle mounted beneath the sliding plate, the extendable handle and the sliding plate having a plurality of cam tracks, and
      cams mounted to the base plate through the cam tracks of both the sliding plate and the extendable handle;
   in response to an operator slidably inserting the electronic console into the chassis in a first direction, causing the male portion of the sliding plate to engage the female portion of the docking base to guide the electronic console along the docking base as the electronic console is slid into the chassis, wherein the sliding plate is fixed in place; and
   in response to an operator pushing in the extendable handle causing the cams and cam tracks to move to the base plate and the electronic console in the second direction to engage connectors on the electronic console with connectors on the midplane, wherein the second direction is orthogonal to the first direction.

* * * * *